United States Patent
Cameron et al.

(10) Patent No.: US 10,643,425 B2
(45) Date of Patent: May 5, 2020

(54) IDENTIFICATION OF POTENTIALLY BANNED TRANSACTIONS

(71) Applicant: Ontario Lottery and Gaming Corporation, Toronto (CA)

(72) Inventors: Chris Cameron, Sault Ste Marie (CA); Christopher Parrott, Sault Ste Marie (CA); Ugo Cicchello, Sault Ste Marie (CA)

(73) Assignee: Ontario Lottery and Gaming Corporation, Toronto, Ontario (CA)

( * ) Notice: Subject to any disclaimer, the term of this patent is extended or adjusted under 35 U.S.C. 154(b) by 445 days.

(21) Appl. No.: 14/242,420

(22) Filed: Apr. 1, 2014

(65) Prior Publication Data

US 2014/0295946 A1 Oct. 2, 2014

(30) Foreign Application Priority Data

Apr. 2, 2013 (CA) ...................................... 2811725

(51) Int. Cl.
*G07F 17/32* (2006.01)
*G06Q 20/40* (2012.01)
*G06Q 30/06* (2012.01)
*G06Q 10/00* (2012.01)

(52) U.S. Cl.
CPC ..... *G07F 17/3241* (2013.01); *G06Q 20/4016* (2013.01); *G06Q 30/06* (2013.01); *G06Q 10/00* (2013.01)

(58) Field of Classification Search
CPC .. G07F 17/329; G07F 17/3288; G07F 17/341; G07F 17/3237; G07F 17/3241; G06C 30/0225; G06F 21/55; G06Q 30/0225; G06Q 20/4016; G06Q 30/06; G06Q 10/00
See application file for complete search history.

(56) References Cited

U.S. PATENT DOCUMENTS

| 6,715,672 B1* | 4/2004 | Tetro | G06Q 20/04 235/379 |
|---|---|---|---|
| 2001/0051539 A1* | 12/2001 | Zach | G06Q 50/34 463/17 |
| 2006/0211493 A1* | 9/2006 | Walker | G06Q 30/02 463/29 |
| 2007/0250441 A1* | 10/2007 | Paulsen | G06Q 20/02 705/39 |
| 2008/0162346 A1* | 7/2008 | Aaron | G06Q 20/24 705/44 |
| 2011/0295672 A1* | 12/2011 | Dimitriadis | G06F 21/554 705/14.26 |
| 2013/0260856 A1* | 10/2013 | Irwin, Jr. | G07F 17/329 463/17 |

OTHER PUBLICATIONS

Office Action from counterpart Canadian Application No. 2,811,725, dated Apr. 8, 2016, 6 pp.

* cited by examiner

*Primary Examiner* — Tramar Y Harper
*Assistant Examiner* — Jeffrey K Wong
(74) *Attorney, Agent, or Firm* — Shumaker & Sieffert, P.A.

(57) ABSTRACT

A system and method for identifying potentially banned transactions in a real time or near real time fashion is provided. The identification of banned transactions may help a lottery corporation to ensure that retailers are enforcing the rules.

18 Claims, 6 Drawing Sheets

IDENTIFICATION OF POTENTIALLY BANNED TRANSACTIONS

This application claims priority to Canadian Application 2,811,725, filed Apr. 2, 2013. The entire content of Canadian Application 2,811,725 is incorporated herein by reference.

TECHNICAL FIELD

The current description relates to identifying potentially banned transactions of a lottery organization, and in particular to identifying potentially banned wagers made at a retail location of the lottery organization.

BACKGROUND

Lottery games may be administered by a central authority in accordance with local rules and regulations set by the central authority. The entity responsible for administering the lottery games, referred to as the lottery administration herein, may provide a number of games to the public. As an example, the lottery administration may provide sports related games that allow a player to wager on one or more sporting events, or may provide draw based lottery tickets that allow a player to purchase a ticket for a subsequently held draw or instant win type tickets that allow a player to purchase a ticket that includes the winning information, often referred to as scratch-off tickets. These types of games are only illustrative, and it should be appreciated that different types of games may also be offered. For example, a hybrid game may be offered that provides a combination of instant win tickets and draw-based tickets.

Regardless of the type of game a player decides to play, a ticket is commonly provided. The ticket may have a unique number, or unique combination of non-unique numbers, that associates the particular ticket information, such as the number of wagers or draws purchased, the predicted outcomes as well as any other additional information the lottery administering entity desires. In order to validate that a purchased ticket is a winner, the ticket may be scanned and the ticket information associated with the ticket retrieved and used to determine if the ticket is in fact a winner. Depending upon the size of the prize, a player may receive the prize directly from the retailer, or may be required to visit the administration entity in order to claim their prize.

The lottery administration typically maintains a retail network of terminals that can be used to purchase tickets as well as validate tickets. The retail terminals are commonly found at convenience stores, grocery stores and pharmacies, although they may be found in various locations. Each transaction at the retail locations, whether it is purchasing tickets or validating tickets, may be stored in a database or other data store. The data store may be used to search for ticket information, such as when or where a particular ticket was purchased. In order to ensure that retailers abide by the rules and regulations of the lottery organization, retailers may be periodically audited in order to determine their compliance with the rules and regulations.

Additionally, the lottery administration may provide rules or regulations on retailers of the lottery. For example, a lottery administration may have a rule preventing retailers from selling a particular player more than $100.00 in wagers at a time. However, these rules or regulations may be difficult to enforce.

It is desirable to have a lottery system that provides an improved, alternative or additional way to identify transactions, such as the purchase of tickets, that may break a rule or regulation.

SUMMARY

In accordance with an embodiment of the present disclosure, there is provided a method of identifying potentially banned transactions, the method comprising receiving, at a central location, a transaction comprising a retailer identifier (ID), a transaction time, a wager amount and wager information; determining one or more related transactions, each of the one or more related transactions having a retailer ID associated with the retailer ID of the received transaction, and a transaction time within a time window from the received transaction; determining a total wager amount as a summation of individual wager amounts of the one or more related transactions and the received transaction; and determining if the total wager amount exceeds an allowed wager amount for an individual transaction.

In a further embodiment the method further comprises raising an alert when the total wager amount is determined to exceed the allowed wager amount.

In a further embodiment the alert is associated with one or more actions to take.

In a further embodiment the one or more actions to take comprise one or more of contacting the retailer; cancelling the received transaction; and preventing the received transaction.

In a further embodiment determining the one or more related transactions comprises retrieving one or more transactions from a data store, the one or more transactions retrieved based on the retailer ID; for each of the retrieved one or more transactions, determining if the respective transaction time matches a time pattern identifying potentially banned transactions with the received transaction's transaction time, the potentially banned time pattern specifying relative transaction times of when a potentially banned transaction may occur; and determining for each of the retrieved transactions matching the potentially banned time pattern if the respective wager information matches the wager information of the received transaction.

In a further embodiment the potentially banned time pattern specifies that potentially banned transactions occur within a threshold time of the received transaction In a further embodiment the threshold time is one of 60 minutes; 45 minutes; 30 minutes; and 15 minutes.

In a further embodiment the potentially banned time pattern specifies that the potentially banned transaction occurs within one of a plurality of threshold times of the received transaction.

In a further embodiment the potentially banned time pattern is retrieved from a plurality of potentially banned time patterns each associated with retailed ID.

In a further embodiment the method further comprises adjusting the potentially banned time pattern associated with the retailer ID of the received transaction when the wager total exceeds the wager threshold.

In accordance with another embodiment of the present disclosure, there is provided a system for identifying potentially banned transactions, the system comprising a processing unit for executing instructions; and a memory unit for storing instructions. When the instructions are executed by the processing unit the system is configured to perform a method comprising receiving, at a central location, a transaction comprising a retailer identifier (ID), a transaction time, a wager amount and wager information; determining one or more related transactions, each of the one or more related transactions having a retailer ID associated with the retailer ID of the received transaction, and a transaction time within a time window from the received transaction; determining a total wager amount as a summation of individual wager amounts of the one or more related transactions and the received transaction; and determining if the total wager amount exceeds an allowed wager amount.

In accordance with a further embodiment, the system is further configured for raising an alert when the total wager amount is determined to exceed the allowed wager amount.

In accordance with a further embodiment of the system, the alert is associated with one or more actions to take.

In accordance with a further embodiment of the system, the one or more actions to take comprise one or more of: contacting the retailer; and cancelling the received transaction.

In accordance with a further embodiment of the system, determining the one or more related transactions comprises: retrieving one or more transactions from a data store, the one or more transactions retrieved based on the retailer ID; for each of the retrieved one or more transactions, determining if the respective transaction time matches the potentially banned time pattern with the received transaction's transaction time, the potentially banned time pattern specifying relative transaction times of when a potentially banned transaction may occur; and determining for each of the retrieved transactions matching the potentially banned time pattern if the respective wager information matches the wager information of the received transaction.

In accordance with a further embodiment of the system, the potentially banned time pattern specifies that potentially banned transactions occur within a threshold time of the received transaction.

In accordance with a further embodiment of the system, the threshold time is one of: 60 minutes; 45 minutes; 30 minutes; and 15 minutes.

In accordance with a further embodiment of the system, the potentially banned time pattern specifies that the potentially banned transaction occurs within one of a plurality of threshold times of the received transaction.

In accordance with a further embodiment of the system, the potentially banned time pattern is retrieved from a plurality of potentially banned time patterns each associated with retailed ID.

In accordance with a further embodiment, the system is further configured for adjusting the potentially banned time pattern associated with the retailer ID of the received transaction when the wager total exceeds the wager threshold.

BRIEF DESCRIPTION OF THE DRAWINGS

Embodiments are described herein with references to the appended drawings, in which.

DETAILED DESCRIPTION

Figure 1:
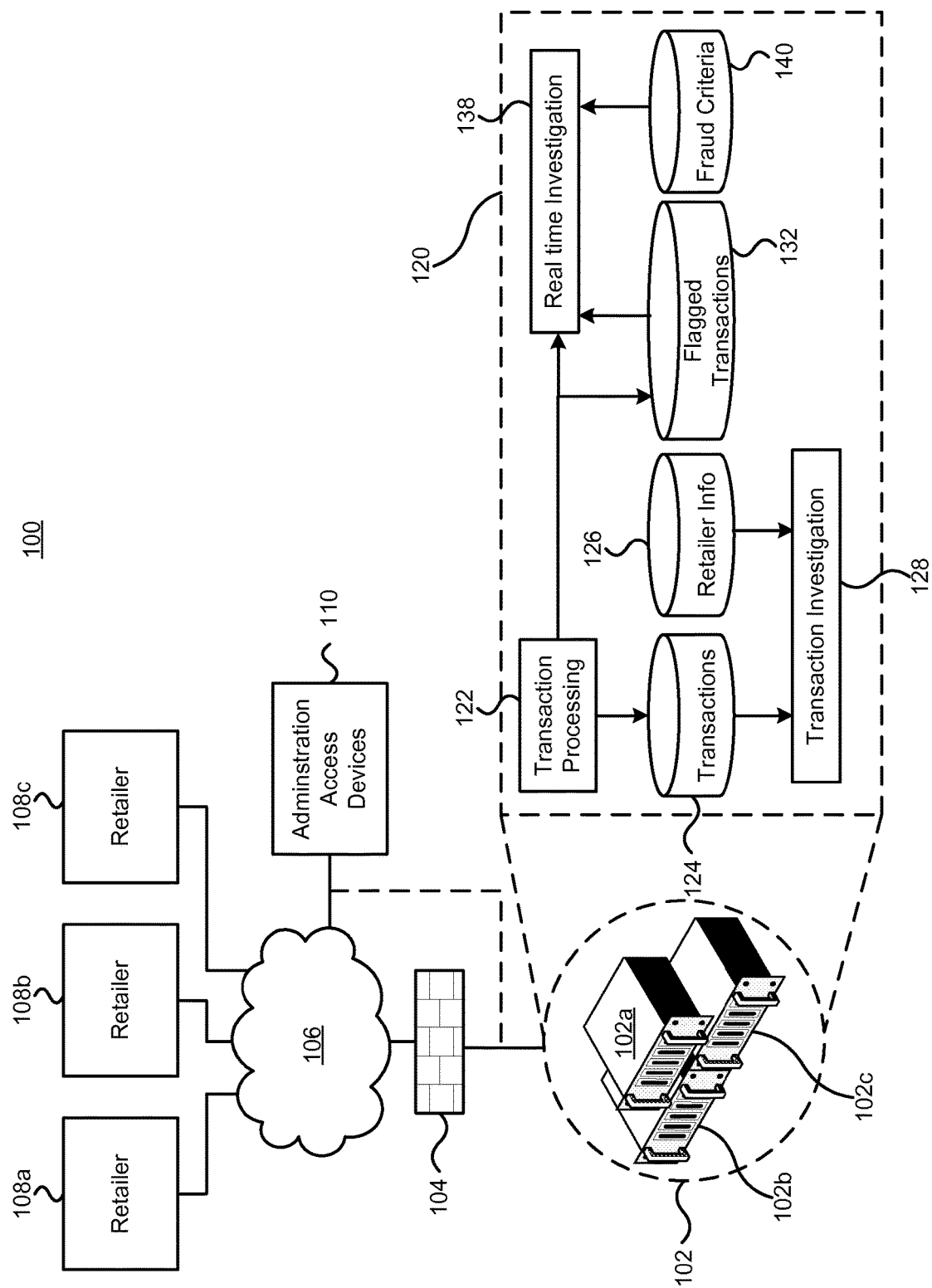
FIG. 1 depicts an information management system within a lottery system.

A lottery corporation may provide numerous different lottery games. The games may be purchased at different retail locations. The lottery corporation may have rules and/or regulations in place to attempt to prevent excessive gambling by a player as well as possibly prevent undesirable retailer behaviour. The rules and regulations may be difficult for the lottery corporation to enforce. For example, a lottery corporation may have a rule limiting the wager amount a retailer can accept from a particular player at one time. A common game offered by lottery corporations is a sports wager type of game. For sports wager games a lottery corporation may have rules in place to limit the wager amount retailer can accept from a single player at a time. It may be difficult to enforce the rules of the lottery corporation since individual tickets are difficult to relate to a single player. For example, if the lottery corporation limits the wager amount for a particular day to $100.00, a retailer may simply enter a number of wager tickets for a player for the maximum wager amount. As described further herein, the purchasing transactions may be processed in real-time, or near real-time, in order to identify potentially banned transactions, that is wager transactions that if placed as a single transaction would break a rule or rules the lottery corporation places on retailers.

Each retailer may sell different lottery games. Lottery games may include different types of game play, such as sports wagers, draws and instant win games. Regardless of the type of the game, a player purchases a ticket, typically from a retail location. The ticket may be associated with a unique identifier that can be subsequently used to determine if the ticket is a winner. The unique identifier may be associated with game and ticket information which may vary depending upon the game played. For example for lottery draw tickets, the ticket information may include an indication of the selected numbers that can then be checked against the actual numbers drawn. As will be appreciated, numbers are typically drawn; however other types of symbols, colours or objects could be used in place of numbers. For sports wager tickets, the ticket information may include an indication of which sporting events are being wagered on as well as the outcomes. For instant win tickets, the ticket information may provide an indication of the prize of the ticket. Although the tickets are described as having a unique identifier that is used to associate the physical ticket with the ticket information, it is possible that the physical ticket itself includes the ticket information encoded on it. Regardless of if the ticket information is directly encoded onto the ticket, or if it is associated with the ticket through a ticket identifier, it typically can be retrieved by scanning a barcode of on the ticket.

Interactions with the lottery system may be stored to a central database or data store. The transactions stored in the lottery system may represent interactions with the lottery system, such as purchasing of tickets and validating tickets. As described further herein, the transaction information may be used to identify potentially fraudulent transactions that may contravene the rules of the lottery corporation.

The following describes various information, including transaction information, retailer information, information on potentially fraudulent transactions and fraudulent activity model information. The information is depicted as being stored in separate databases; however, it is contemplated that the information can be stored in a larger or smaller number of databases. Additionally or alternatively, certain information may be stored in other structures such as files, lists and/or tables. Further still, certain information may be hard-coded into the functionality provided.

FIG. 1 depicts an information management system within a lottery system. The lottery system 100 comprises a plurality of interconnected components. A computing system 102 is depicted as providing a central location for storing and processing of lottery system information. The computing system 102 may be provided by one or more physical computers 102a, 102b, 102c each comprising at least one processor for executing instructions stored in an associated memory. The computing system 102 may be secured from unauthorized access through one or more components including a firewall 104 that controls the flow of information between an internal network and the external network 106. Although described as being provided at a single location, the computing system 102 may be provided by a number of separately located computing systems coupled together by a secure connection, or other network connection. Additionally or alternatively still, one or more backup and/or failover computing systems may be provided in order to provide for a highly available computing system.

A plurality of external devices can communicate and interact with the computing system 102 over the network 106. The lottery system may comprise a plurality of retail locations 108a, 108b, 108c (referred to collectively as retail locations 108). Each of the retail locations 108 may include one or more retail terminals for the purchase and validation of tickets. The retail terminals at the retail locations 108 may communicate with the computing system 102 in order to send and receive ticket information, whether it is in regards to tickets that are being purchased, validated, redeemed or exchanged. Additionally, ticket validation devices may be provided in various retail locations. The ticket validation devices allow a ticket to be validated in order to determine if it is a winner or not. Each of the retail locations 108 may be assigned a unique retail identifier (ID) that is used to uniquely identify transactions that occur in the retail location.

The retail locations 108 may further comprise instant win devices. As will be appreciated, instant win tickets typically comprise scratch tickets that are printed at a location and distributed to the retailer locations. The instant win tickets are typically distributed to retailers in a number of packs of tickets. Each pack must be activated before the ticket can be sold and redeemed. Further the packs are tracked as they are distributed. The tracking and activation information may be provided by the instant win ticket devices.

Administrative access devices 110 may be used to communicate with the computing system 102. The administrative access devices 110 may be a typical computing device such as a laptop, personal computer, tablet computer or smartphone. The administration access devices 110 allow administrative tasks to be accomplished, such as controlling user access, maintaining support information such as insider information and retailer information. The administrative access devices 110 may be located either on an external side of the firewall 104 or on the internal side.

Various information can be generated and stored by the lottery system 100. Further each interaction with the computing system may generate a transaction that is stored. The transaction information may be stored in order to meet regulatory requirements, business objectives, gaming requirements, or other requirements. Transactions associated with certain ticketing events may be processed in order to link a transaction with a previous transaction. The linked transaction information may also be stored and subsequently used to provide a transaction profile of a ticket facilitating easy investigation of a ticket, and enabling a lottery administration entity to provide new features, such as reprinting of lost tickets as well as verification of purchasers for large prize tickets. Further, the transaction information can be used to flag transaction that may be indicative of risky retailer behavior. For example, a lottery corporation may have regulations against retail employees from playing lottery games while at work. This type of behavior may be flagged by transactions which indicate that the lottery ticket was purchased and verified a number of hours later at the same retail location. Additionally, retailers may facilitate individuals wagering a greater amount of money on a ticket than allowed by the lottery corporation. For example, a lottery corporation may limit wagers for a sports type ticket to a maximum of $100.00 per day. Retailers may ignore this rule and allow players to purchase numerous tickets for the same wager at a time. As described further herein, these potentially banned transactions can be flagged in real-time or near real-time so that action can be taken by the lottery corporation to prevent, limit or mitigate the potentially banned retailer behavior.

The transaction linking, generation of a ticket's transaction profile and real-time flagging of potentially banned transactions may be done by information management functionality 120 provided by the computing system 102. The information management functionality 120 includes functionality for processing transactions 122. The transaction processing functionality 122 may include functionality for receiving and storing transactions. For example, when a customer purchases a lottery ticket from a retailer, a transaction can be generated, which would include an identifier of the retailer, and the transaction processing functionality 122 may receive the transaction and store it in a transaction database 124. The transaction processing functionality 122 may further attempt to link a received transaction to one or more previous transactions. The linked transaction information may also be stored in the transaction database 124. The information management functionality 120 may further comprise functionality for accessing and storing retailer information 126, such as retail location information, owner's name, employee information, as well as device identifiers located at the retail location.

The transaction processing functionality 122 may also flag transactions if they may be indicative of retailer behavior that is considered potentially risky. As described further herein, the transactions may be processed in real-time or near-real time in order to identify potentially banned transactions as they occur, and so take an appropriate action in a timely manner. The banned transactions may be a group of transactions, which individually do not break any rules or regulations of the lottery corporation, but if made as a single transaction would break a rule or regulation of the lottery corporation. The flagged transactions may be stored in a database of potentially fraudulent transactions 132. For example, the real-time identification of potentially banned behavior may process only sport wager type of tickets. As such, all sports wagering tickets may be flagged and stored in the database of potentially banned transactions. Although described as a separate database, it is contemplated that the potentially banned transactions may be stored only in the transaction database 124. However, storing the potentially banned transactions, or copies of the transactions, in a separate location may facilitate the real-time processing of the information.

The information stored in the transaction database 124, and possibly the retail information database 126, may be accessed by investigation support functionality 128. The investigation support functionality 128 may generate a transaction profile of a ticket under consideration. The transaction profile, generated using the linked transaction information, may be used to help in identifying a specific ticket, identifying a purchaser of the ticket or other purposes as desired.

A real time investigation component 138 may generate an alert when a transaction is received that may be banned. For example, if a transaction is received for a sports wager that may be from a retailer taking the wager from a person having already wagered the maximum daily amount, the real-time investigation component 138 may generate an alert. As described further herein, the generated alert may be acted upon in various ways. For example, the alert may prevent the wager from being made, or the alert may cause the lottery corporation to contact the retailer to enquire about the questionable transaction.

As described further below, the real-time investigation component 138 may receive transaction information from the transaction processing component 122 in real time or near-real time and determine if the received transaction may contravene rules taking into account previous transactions. The determination as to whether a transaction may contravene rules can be based on one or more banning criteria which may be stored in a ban criteria database 140, although the ban criteria could be stored in other manners, such as in files, tables or coded into the real time investigation component. Regardless of how the ban criteria are stored, once transactions are determined to be possibly in contravention of a rule or regulation and so may be considered a banned transaction, the real time investigation component may generate an alert in order to allow an action or actions to be taken in a timely manner.

Figure 2:
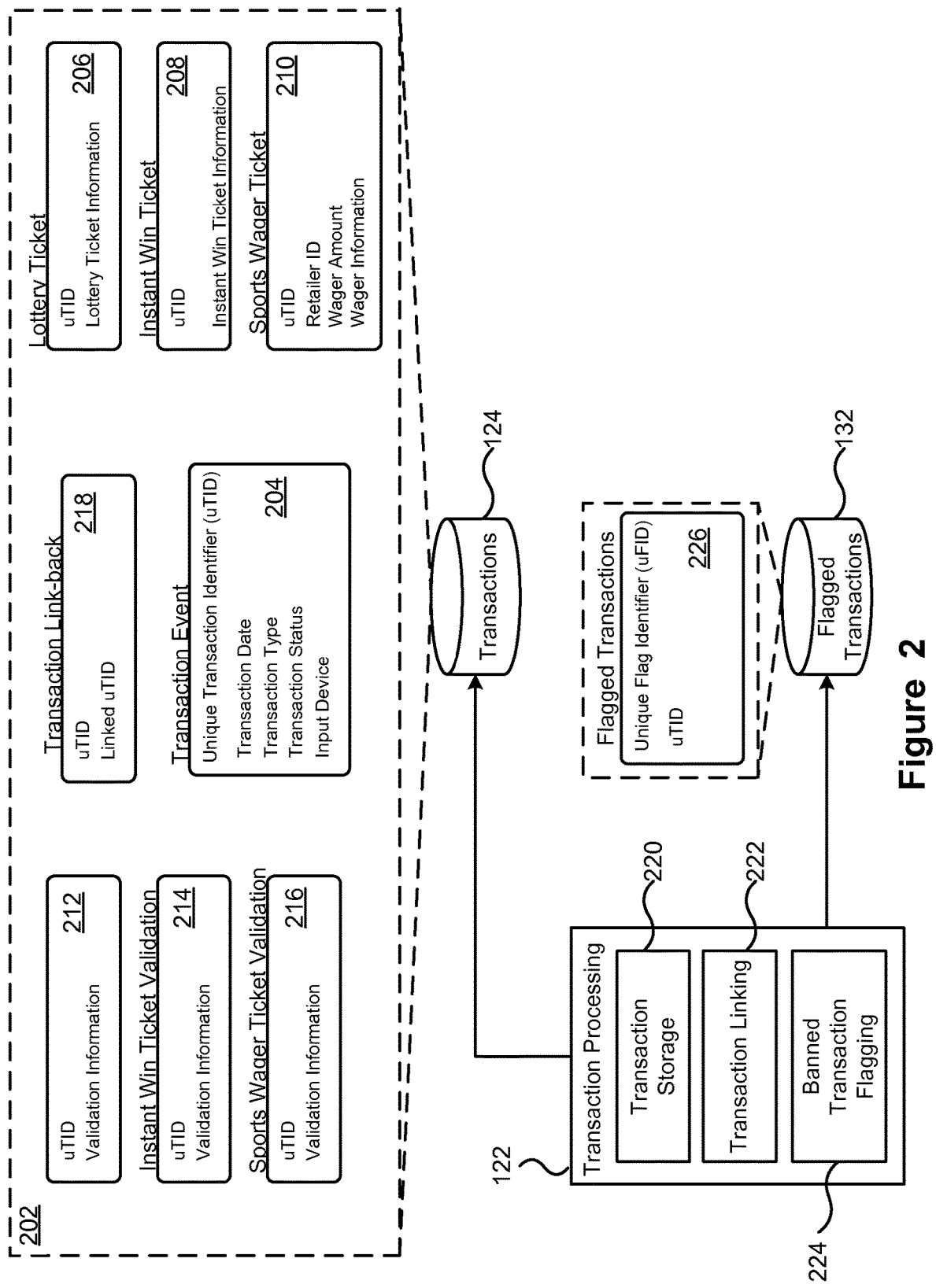
FIG. 2 depicts components of the information management system functionality.

FIG. 2 depicts components of the information management system functionality. In particular, FIG. 2 depicts the transaction processing functionality 122. As described above, the information management functionality 120 comprises transaction processing functionality 122 and a transactions database 124. The transaction processing functionality 122 may further flag transactions, which can be stored in the flagged transactions database 132. As depicted, the transaction database 124 may store the transaction information according to a data model 202.

As depicted, the data model 202 centers around a transaction event used to capture the common information of a transaction. A transaction is associated with an event in the lottery system. Different types of events, and so different types of transactions, are possible. For example, generating a new lottery ticket may be an event type that generates a corresponding transaction. Similarly, validating the lottery ticket may be another event type that generates a corresponding transaction. Broadly, ticket related transactions are grouped into generation events and validating events. The different generation events may further be grouped based on the type of ticket generated, such as whether it is the purchase of a draw lottery ticket, the purchase of an instant win ticket, or the purchase of a sports wager ticket. Further generation events, and corresponding transactions, may include the reprinting or reissuing of tickets, cancelling of tickets, and generation of an exchange tickets. Tickets may be reprinted if for example the numbers of have become illegible, or the ticket is ripped or otherwise compromised or if the original ticket was misprinted. Tickets may be cancelled, for example if a ticket was purchased in error, or if a ticket is lost. An exchange ticket may be generated in situations where the ticket comprises a plurality of games and one of the games has concluded, and so a prize may be redeemed, while another game on the ticket has not concluded. In such situations, the prize for the completed game can be awarded, and the original ticket exchanged for another ticket with only the remaining un-concluded games on the ticket.

As depicted, a transaction event table 204 may store information common to all transactions. The information includes a unique transaction identifier (uTID for brevity). The uTID is used to uniquely identify a particular transaction, and may also be used to associate additional information with the transaction. The transaction event table 204 may store additional information for each event. For example, it may store a date and time of the transaction, a type of the transaction, a status of the transaction and an input device that generated the transaction.

The uTID of a transaction can be used to associate the transaction event with specific information of the transaction according to the type of event that generated the transaction. The additional information may be stored in respective tables. As depicted, a lottery ticket table 206 may store a uTID and the lottery ticket information of the ticket. The lottery ticket information may include information specific to the draw based lottery ticket, such as the number of boards or games played, the selected numbers of each board or number, whether the numbers were selected by the lottery system or by the purchaser, whether the ticket is a new ticket, a re-purchase ticket where a player re-purchases the same selected numbers after validating a ticket, or whether the transaction is for cancelling a particular ticket. The lottery ticket information may include further information such as a retailer identifier identifying the location of the ticketing event and any other information desired by the lottery administration entity.

An instant win ticket table 208 stores transaction information associated with instant win lottery tickets. The instant win lottery tickets are typically scratch-off tickets. The instant win lottery ticket table 208 may store uTIDs of transactions and associated instant win ticket information. The instant win ticket information may include information about the type of game, the prize of the ticket as well as pack and activation information.

A sports wager ticket table 210 stores transaction information associated with sports wager tickets. A sports wager ticket allows a player to wager a desired amount, up to a maximum amount set by the lottery corporation, on an outcome of one or more sporting events. The lottery corporation may have rules on place that prevent a retailer from placing wagers for a single player in excess of the maximum amount. The table 210 may store uTIDs of transactions, a retail location the wager was placed and associated sports wager ticket information. The sports wager ticket information may include information about the type and amount of the wager, as well as specifics about the wager, such as the selected winners.

Separate ticket validation tables 212, 214, 216 may store validation information associated with validation events for draw lottery tickets, sports wager tickets and instant win tickets. The validation information for each ticket type may provide information on the validation of tickets, such as where the ticket was validated, the result of the validation and the amount of the prize awarded.

In addition to the core transaction information, the ticket information and the validation information the transaction database 124 may further comprise a transaction link-back table 218. The transaction link-back table may associate a uTID of a transaction to a uTID of a linked transaction. The linked transaction is an associated transaction. As an example, a transaction for validating a ticket may be linked back to the transaction associated with the purchase of the ticket.

The information management functionality 120 further comprises the transaction processing functionality 122. The transaction processing functionality 122 comprises transaction storage functionality 220 that can receive a transaction or transaction information from retail locations or other locations within the lottery system 100. Once the transaction storage functionality 220 receives the transaction, or transaction information, it stores the transaction in the transaction database 124. In addition to the transaction storage functionality 220, the transaction processing functionality 120 further comprises transaction linking functionality 222. The transaction linking functionality 222 may receive transactions or transaction information, determine a previous transaction associated with the received transaction and then store the linked transactions together in the transaction link-back table 218. The transaction link-back table allows linked transactions to be quickly determined, allowing all events associated with a ticket to be quickly determined, retrieved and presented to a user.

The transaction processing functionality 120 receives transaction information associated with events in the lottery system 100 such as purchasing tickets, validating tickets, entering retailer complaints, as well as other events for which transaction information is stored. Depending upon the type of the transaction, it may be linked to previous, and related, transactions. The transaction processing functionality 120 may further provide functionality for flagging transactions that may be used in determining if a transaction is possibly in contravention of a rule or regulation of the lottery corporation. The transaction flagging functionality 224 may receive transaction information, which includes a transaction type. The transaction type may then be used to determine if that transaction type is associated with transactions that may be fraudulent. If it is, the transaction may be stored in a flagged transactions database 126 for subsequent access by the real time investigation component 138. As an example, a transaction type may be associated with a sports wager ticket. A lottery corporation may process wager type transactions to determine if the transaction is possibly indicative of potentially undesirable behaviour, for example by placing a number of wagers for a single player to provide wagering a greater amount than allowed. Transactions may be flagged based on further characteristics. For example, a lottery corporation may only wish to process wager type transactions from retail locations in a particular geographic area, or specific retail locations. It is noted that although the transaction may be flagged as potentially banned, it does not necessarily mean that the retailer is involved in behavior in contravention of the rules or regulations, for example providing a player numerous wager tickets in excess of the maximum wager amount, but rather that the transaction information can be used in determining if a transaction may break a rule or regulation. That is, the transaction flagging functionality 224 flags all transactions matching a particular criteria, whether they are breaking a rule or regulation or not, and the real-time investigation component 138 can subsequently use the flagged transactions in determining if a new transaction is potentially banned.

If the transaction is flagged, it may be stored in a flagged transaction database 132. A flagged transaction stored in the database 132 may simply store a unique flag (ID) 226 that uniquely identifies the flagged transaction. Alternatively, the flagged transaction database 132 may store a copy of the transaction information that the real time investigation component 138 requires so that the real time investigation component 138 does not require accessing the main transaction database 124. Storage of the flagged transactions in the separate database 126 may facilitate the real time processing of transactions. However, it is possible for the real-time investigation component 138 to retrieve the required transaction information from the main transaction database 124. In such a case, it is not necessary to flag the transactions for storage as provided by the banned transaction flagging component 224.

As described, the a transaction may be banned if it contravenes one or more rules established by the lottery corporation. Transactions may be processed in real time or near real time in order to identify the potentially banned transactions. By processing the transactions in real time, the potentially banned transactions can be identified as they occur, allowing the lottery corporation to take action to address the potentially banned transaction as it occurs.

Figure 3:
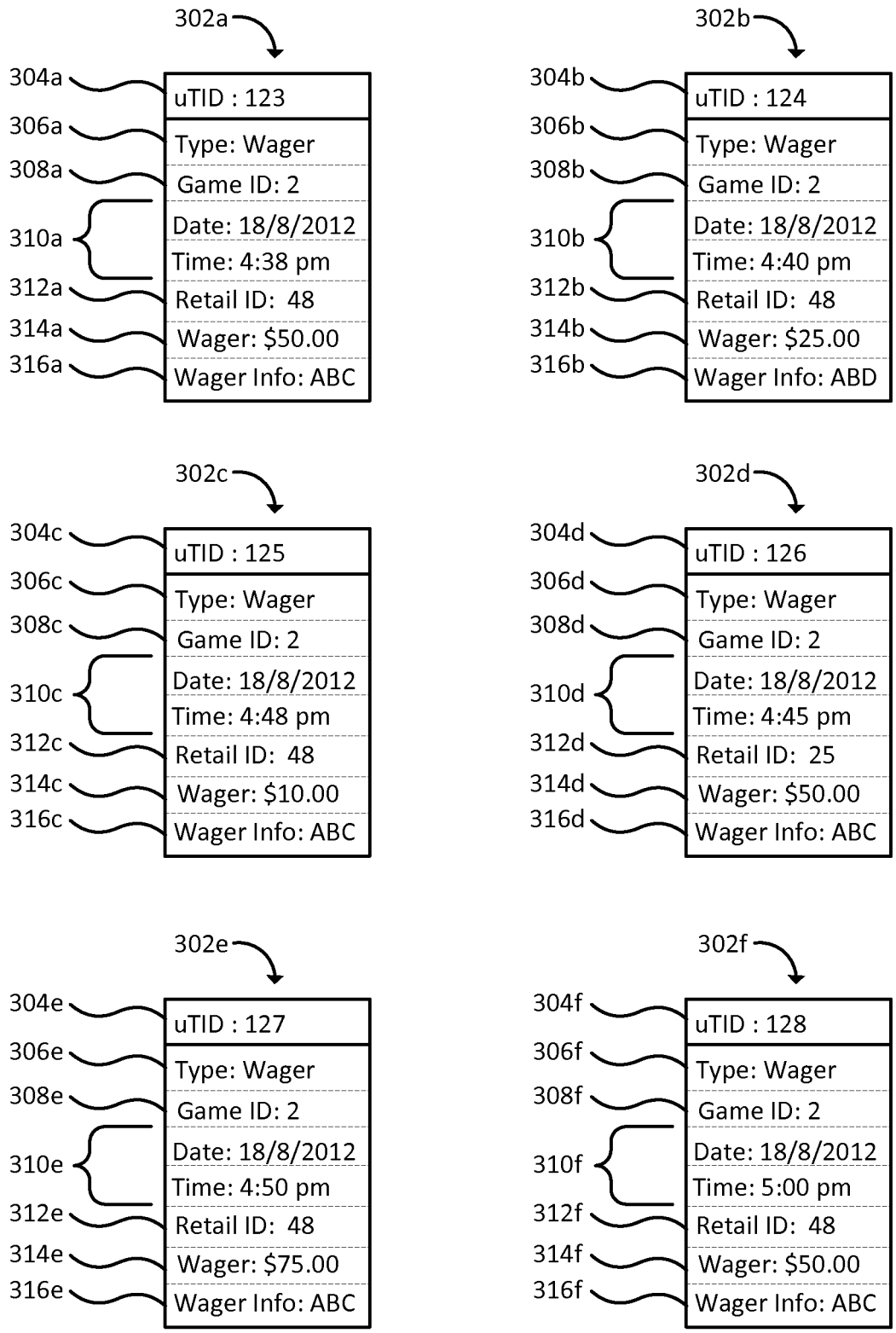
FIG. 3 depicts various wager transactions.

FIG. 3 depicts various wager transactions. The identification of potentially banned transactions will be described further with regards to the depicted transactions. A number of different transactions 302a,302b,302c,302d,302e,302f are depicted (referred to collectively as transactions 302). Each of the transactions 302 has a unique transaction identifier (uTID) 304a,304b,304c,304d,304e,304f for uniquely identifying the individual transactions 302. A transaction type 306a,306b,306c,306d,306e,306f is used to indicate a type of the transaction. A game identifier 308a,308b,308c,308d, 308e,308f may be used to identify a specific game for the transaction. A date and time 310a,310b,310c,310d,310e, 310f the transaction occurred may be associated with the transactions. A retail identifier 312a,312b,312c,312d,312e, 312f may be used to identify a retail location that the wager was placed. The transactions 302 may further comprise a wager amount 314a,314b,314c,314d,314e,314f and wager information 316a,316b,316c,316d,316e,316f. The wager information 316 provides an indication of the wagers that were placed, for example it may indicate the outcome of one or more sporting events selected by the player. The wager information 316 is depicted as characters in order to provide an indication as to whether or not two transactions share the same wager information.

Each of the transactions 302 are depicted as being a sports wager type game. The transactions occur at various times, with the transaction 302a and 302f occurring last. The transactions 302a,302b,302c,302e,302f are depicted as occurring at the same retail location, namely the retail location identified by ID 48. Transaction 302d is depicted as occurring at a different location, namely the retail location identified by ID 25. Transactions 302a,302c,302e,302f are depicted as having the same wager information, depicted as 'ABC', while transactions 302b and 302d are depicted as having different wager information, namely 'ABD'.

A transaction may be considered as potentially banned if it contravenes one or more rules of the lottery corporation. For example, the lottery corporation may limit the wager amount a retailer can place for a single player at a time, for example a maximum of $100.00. Although the tickets are not associated with an individual, it may be possible to identify transactions that may be placed by the retailer for the same player. For example, if a number of transactions occur within a short time period of each other from the same retail location with the same or similar wager information and have a combined wager amount greater than the allowable limit the transactions may be placed by the retailer for the same player. As such, the transaction should be identified as potentially banned. It is noted that the transactions are identified as potentially banned since it is possible that the transactions are from different players that placed the same wagers at the same time and location.

The transaction processing component 122 receives the first transaction 302a and checks it against previous transactions to determine if the transaction 302a is potentially banned; however, since there are no previous transactions the received transaction 302a is not identified as potentially banned. The transaction 302a may be stored for subsequent processing. The next transaction 302b is received and checked against the previous transactions, in particular transaction 302a, to determine if the transaction 302b is potentially fraudulent. In order to determine if the transaction 302b is potentially banned, the characteristics of the transaction is checked against the characteristics of the previous transactions. As can be seen, the two transactions occurred at the same retail location but do not have the same wager information and as such are not considered as related transactions that were purchased by the same player.

The next transaction 302c is received and its characteristics are checked against the characteristics of the previous transactions 302a, 302b. The transactions 302a, 302b, 302c each occurred at the same location. The new transaction 302c as well as the first transaction 302a have the same wager information and occurred within a close time of each other. The time window in which transactions are considered to be related may be 15 minutes or other time amounts. The two transactions 302c 302a are considered to be related transactions. However, the sum of their wager amounts does not exceed the maximum amount for wagers that the retailer can place for a single player at a time and as such the transactions are not in contravention of a rule or regulation.

The next transaction 302d is received and its characteristics are checked against the characteristics of the previous transactions 302a, 302b, 302c. As depicted, the transaction 302d occurred at different location and as such, is not considered to be related to any of the previous transactions.

The next transaction 302e is received and again its characteristics are checked against the previous transactions. As described above, the time period in which potentially banned transactions may occur may be 15 minutes, and as such only transactions that occurred within the potential time window may be considered. Although the time window is described as being 15 minutes, different time windows are possible. Further, a number of different time windows are possible. If the time window is 15 minutes, the first transaction 302a is not considered. The transaction 302e occurred at the same retail location as transaction 302c and 302b. The transaction 302e has wager info that matches the wager info of transaction 302c and as such the transactions 302e and 302c are considered as related. However, again the total wager amount of the related transactions is less than the maximum amount.

The next transaction 302f is received and its characteristics are checked against the previous transactions. The transactions that occurred within the time window at the same retail location and have the same wager information are transactions 302f, 302e, and 302c. The total amount of the wagers of the related transactions 302c, 302e, 302f exceeds the maximum amount and as such the transaction is identified as potentially being a banned transaction that is in contravention of the rules or regulations and an alert is raised. The other related transactions may also be considered as potentially banned.

The alert raised when a transaction is determined to be possible banned may provide actions to take. For example the action may be to contact the retailer to determine if the transactions were actually banned. Further the action to take may be escalated depending upon the number of transactions that have been identified as potentially banned. For example, if it is the first time a transaction has been identified as potentially banned for a retailer, no action may be taken at first. If the number of transactions identified as potentially banned for a particular retailer exceeds a threshold amount, the action may be to contact the retailer to investigate the transactions.

Figure 4:
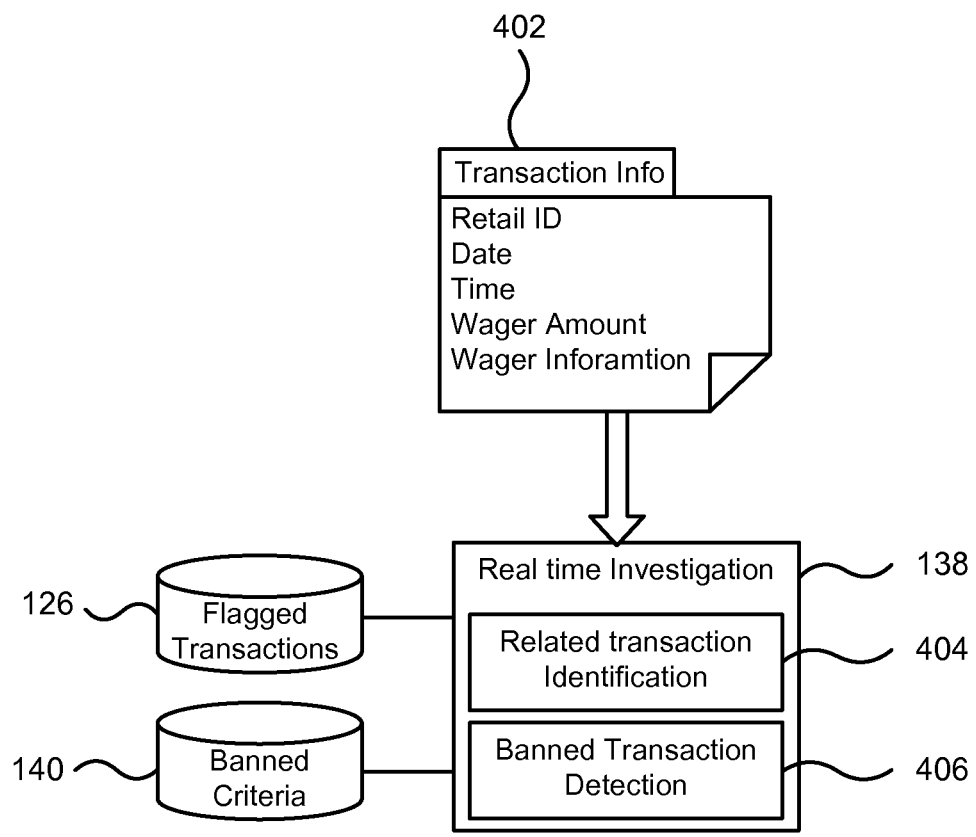
FIG. 4 depicts a real time investigation component.

FIG. 4 depicts the real time investigation component 138. The real time investigation component 138 receives transaction information 402 for sports wagers. The transaction information 402 includes a retail ID identifying the location of the transaction, a date and time of the transaction, a wager amount, and wager information identifying one or more selected outcomes of a sporting event or events. The real time investigation component 138 receives the transaction information and processes it. The real time investigation component 138 comprises a related transaction identification component 404 as well as a banned transaction detection component 406. The related transaction identification component 404 identifies transactions from the flagged transaction database 126, or alternatively from the transaction database 124 that are considered to be related to the received transaction 402. Transactions may be considered as being related based on different criteria that are stored in the ban criteria database 140 or other structure. Related transactions will have occurred at the same retail location within a particular time window of each other. The time window may be retailer specific. For example, if a retailer does not have a history of banned transactions, the time window may be relatively small such as 5 or 10 minutes. If the retailer has a history of banned transactions the time window may be larger for example 15 or 30 minutes. Further multiple time windows may be used. For example, a retailer may purchase a number of tickets for a player at different times throughout the day in order to try to avoid detection of the banned transactions. For example, the retailer may place another wager for the player each hour. As such a time window for the retailer could be a number of 15 or 20 minute windows with an hour between each window. In addition to check the time and location of the transactions to determine related transactions, the related transaction identification component may also check the wager information to determine if it is the same or similar. A player may wish to place a large amount on the same event or events and as such the wager information would be the same.

The related transaction identification component 404 receives the transaction information 402 and determines related transactions, if any. The identified related transactions, including the received transaction 402, are provided to a banned transaction detection component 406 that determines if the provided related transactions are considered banned, and if they are raises an alert. The group of related transactions may be considered banned transactions if the total amount of all of the wagers exceeds an allowable maximum wager amount. If the total exceeds the maximum amount, an alert may be generated that can provide an action to take. The action to take may be based on the number of banned transactions that have occurred at the retail location or associated retail location, such as retail locations commonly owned. The actions to take may be escalated, for example from doing nothing, to calling the retail location, to meetings with retail owners, temporary suspension of the ability to sell lottery tickets etc. Further, if the transaction processing is done in real time, it may be possible to determine if the transaction is banned before it is completed and so cancel or prevent the transaction.

Figure 5:
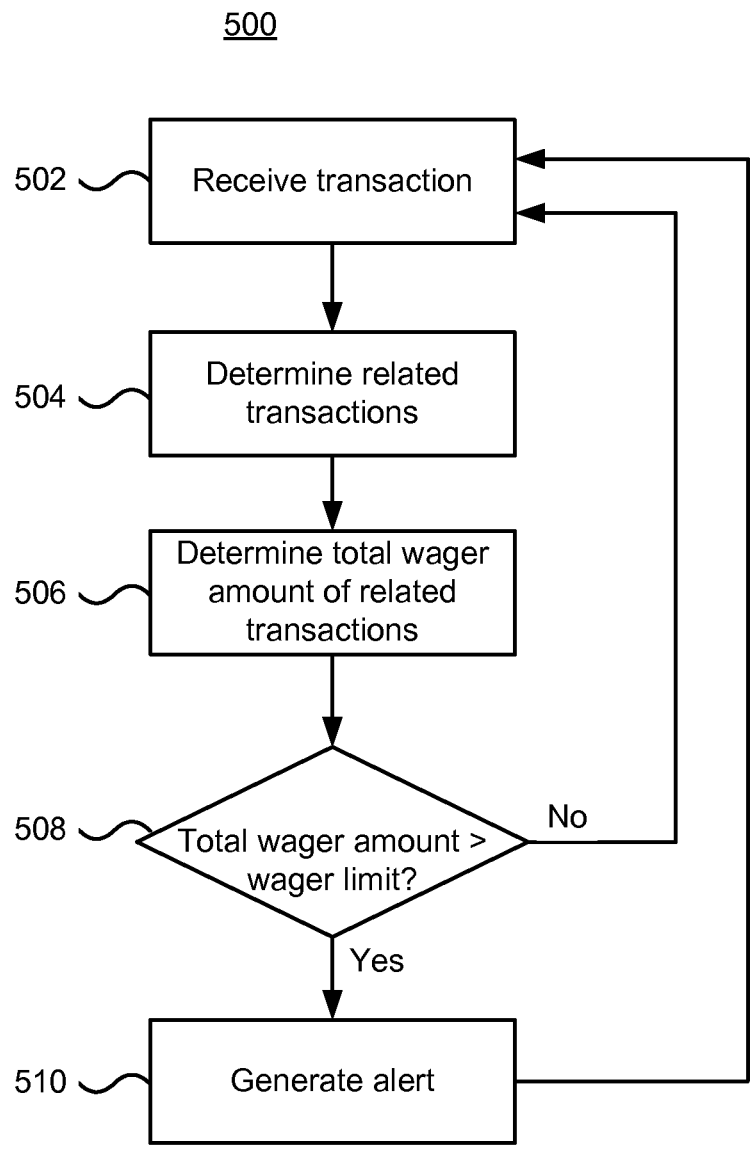
FIG. 5 depicts a method of identifying potentially fraudulent transactions.

FIG. 5 depicts a method of identifying potentially banned transactions. The method 500 begins with receiving a transaction (502). The transaction may be received at a central location and comprise various information including a retailer ID identifying the location the transaction occurred, a time the transaction occurred at, a wager amount for the transaction and wager information indicating one or more outcomes of one or more events. The method determines related transactions (504) to the received transaction. One or more related transactions are identified based on characteristics of the transactions. The related transactions have the same retailer ID and occurred within a time window from the received transaction. Once the related transactions are determined, the total wager amount of the related transactions, including the received transaction, is determined (506). The total wager amount is checked to determine if it is greater than a maximum wager limit (508). If the total wager amount does not exceed a maximum wager amount (No at 508) the method returns and waits to receive a further transaction (502). If the total wager amount does exceed the maximum wager amount (Yes at 508) an alert is generated (510).

Although not described above, further considerations may be used when considering if the related transactions are potentially banned. For example, it could be assumed that a retailer will attempt to purchase the minimum number of tickets, and as such most of the transactions will be for the maximum allowable amount. As such, the transactions may be considered banned transactions if all of the, except one, is for the maximum amount. Similarly, if there are a number of related transactions, only those for the maximum wager amount may be considered as banned.

Figure 6:
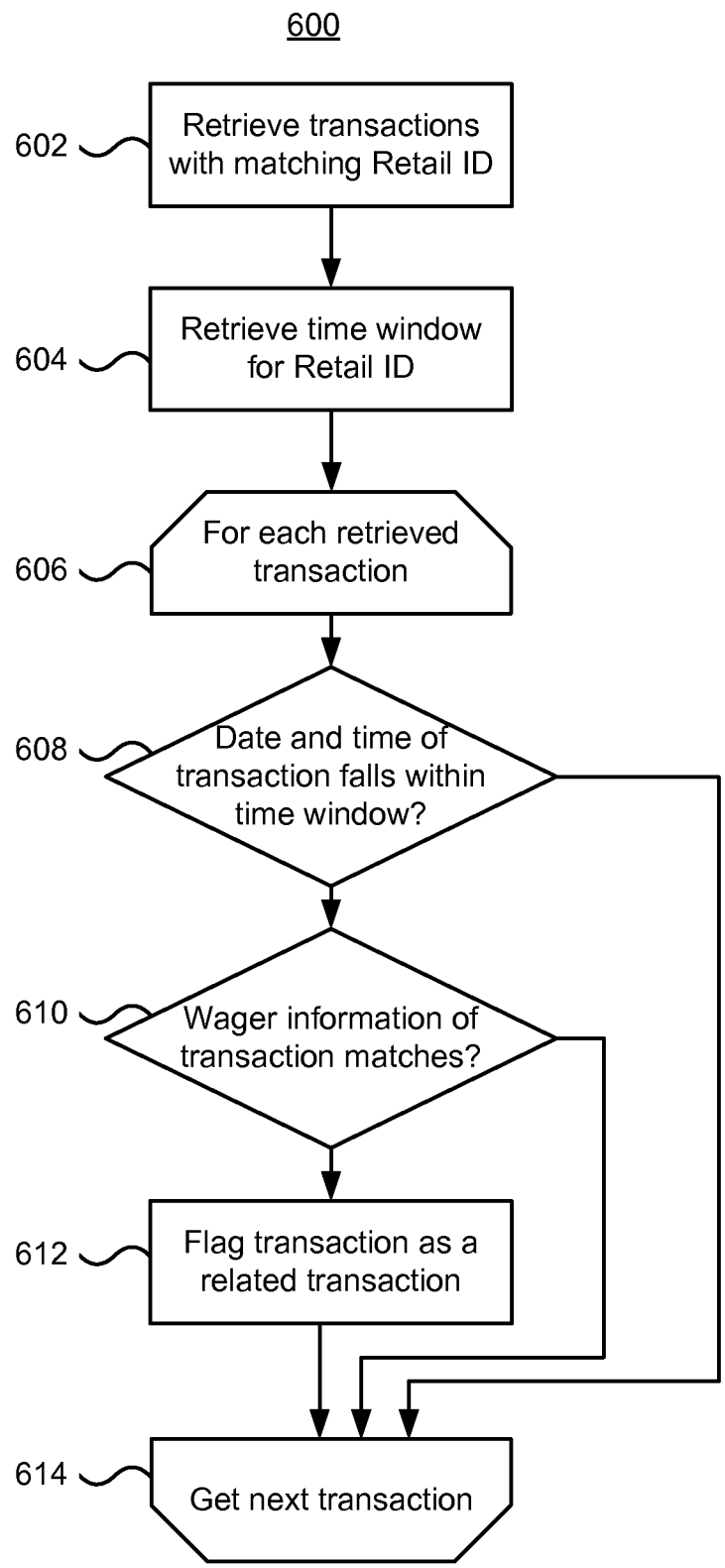
FIG. 6 depicts a method of determining related transactions.

FIG. 6 depicts a method of determining related transactions. The method 600 determines transactions that are related to a first transaction. The method 600 begins with retrieving transactions with matching retail IDs (602) to the first transaction. The transactions may be retrieved from the flagged transaction database or the transaction database. A time window is retrieved that is associated with the retail ID (604). The time window specifies one or more time windows, relative to the time of the first transaction during which related transactions may have occurred. For each of the retrieved transactions (606), the method determines if the date and time of the transaction falls within the time window (608). If it does not (No at 608) the next transaction, if any, is retrieved (614). If the date and time of the transaction does fall within the time window (Yes at 608), it is determined if the wager information of the transaction matches (610) the wager information of the first transaction. The wager information may match, if for example the same outcomes for the same events were selected. If the wager information does not match (No at 610) the next transaction, if any, is retrieved (614). If the wager information does match (Yes at 610), the transaction is flagged as being a related transaction (612) and the next transaction, if any, is retrieved (614). Once all of the retrieved transactions have been processed, the transactions flagged as related transactions can be grouped together with the first transactions and considered as related transactions which may have been placed by the retailer for a single player.

As described above, a system and method for identifying potentially banned transactions in a real time or near real time fashion is provided. The identification of banned transactions may help a lottery corporation to ensure that retailers are enforcing the rules.

The systems and methods described above provide functionality for managing lottery information, including locating related transactions and identifying potentially banned transactions. The system and methods described herein have been described with reference to various examples. It will be appreciated that components from the various examples may be combined together, or components of the examples removed or modified. As described the system may be implemented in one or more hardware components including a processing unit and a memory unit that are configured to provide the functionality as described herein. Furthermore, a computer readable memory, such as for example electronic memory devices, magnetic memory devices and/or optical memory devices, may store computer readable instructions for configuring one or more hardware components to provide the functionality described herein.

What is claimed is:

1. A method of identifying potentially banned transactions in a lottery system as they occur, the method implemented in a computing system of the lottery system, the method comprising:

receiving, at the computing system of the lottery system over a network connection, a transaction for purchasing a wager ticket, the received transaction comprising a retailer identifier (ID), a transaction time, a wager amount and wager information, the transaction being received from a lottery device at a remote retail location;

accessing a database storing previous transactions for purchasing wager tickets that have occurred in the lottery system;

determining, by the computing system of the lottery system, one or more related transactions from the previous transactions stored in the database, each of the one or more previous transactions determined to be related transactions having:
 a retailer ID associated with the retailer ID of the received transaction;
 a transaction time within a time window from the received transaction; and
 wager information corresponding to the wager information of the received transaction;

determining, by the computing system of the lottery system, a total wager amount as a summation of individual wager amounts of the one or more related transactions and the received transaction;

determining, by the computing system of the lottery system, if the total wager amount exceeds an allowed wager amount for an individual transaction;

generating an alert at the computing system of the lottery system when the total wager amount exceeds the allowed wager amount, the alert providing one or more actions to take; and performing the one or more actions associated with the alert, the one or more actions comprising:
 preventing the received transaction from proceeding;
 cancelling the received transaction if already completed;
 cancelling one or more of the related transactions; and
 preventing further transactions from the retailer associated with the retailer ID.

2. The method of claim 1, wherein determining the one or more related transactions comprises:

retrieving one or more transactions from the database, the one or more transactions retrieved based on the retailer ID;

for each of the retrieved one or more transactions, determining if the respective transaction time matches a time pattern identifying potentially banned transactions with the received transaction's transaction time, the potentially banned time pattern specifying relative transaction times of when a potentially banned transaction may occur; and determining for each of the retrieved transactions matching the potentially banned time pattern if the respective wager information matches the wager information of the received transaction.

3. The method of claim 2, wherein the potentially banned time pattern specifies that potentially banned transactions occur within a threshold time of the received transaction.

4. The method of claim 3, wherein the threshold time is one of:
60 minutes;
45 minutes;
30 minutes; and
15 minutes.

5. The method of claim 2, wherein the potentially banned time pattern specifies that the potentially banned transaction occurs within one of a plurality of threshold times of the received transaction.

6. The method of claim 2, wherein the potentially banned time pattern is retrieved from a plurality of potentially banned time patterns each associated with retailed ID.

7. The method of claim 6, further comprising adjusting the potentially banned time pattern associated with the retailer ID of the received transaction when the wager total exceeds the wager threshold.

8. The method of claim 1, wherein the one or more actions to take are based on a number of banned transactions that have occurred within a period time for the retailer associated with the retail ID.

9. The method of claim 8, wherein the one or more actions to take are escalated.

10. A computing system of a lottery system for identifying potentially banned transactions in the lottery system as they occur, the system comprising:
a processing unit for executing instructions; and
a memory unit for storing instructions, which when executed by the processing unit configure the system to:
receive, at the computing system of the lottery system over a network connection, a transaction for purchasing a wager ticket, the received transaction comprising a retailer identifier (ID), a transaction time, a wager amount and wager information, the transaction being received from a lottery device at a remote retail location;
access a database storing previous transactions for purchasing wager tickets that have occurred in the lottery system;
determine, by the computing system of the lottery system, one or more related transactions from the previous transactions stored in the database, each of the one or more previous transactions determined to be related transactions having:
a retailer ID associated with the retailer ID of the received transaction;
a transaction time within a time window from the received transaction; and
wager information corresponding to the wager information of the received transaction;
determine, by the computing system of the lottery system, a total wager amount as a summation of individual wager amounts of the one or more related transactions and the received transaction;
determine, by the computing system of the lottery system, if the total wager amount exceeds an allowed wager amount for an individual transaction;
generate an alert at the computing system of the lottery system when the total wager amount exceeds the allowed wager amount, the alert providing one or more actions to take; and
perform the one or more actions associated with the alert, the one or more actions comprising:
preventing the received transaction from proceeding;
cancelling the received transaction if already completed;
cancelling one or more of the related transactions; and
preventing further transactions from the retailer associated with the retailer ID.

11. The system of claim 10, wherein the instructions, which when executed by the processing unit, configure the system to determine the one or more related transactions comprise instructions, which when executed by the processing unit, configure the system to:
retrieve one or more transactions from the database, the one or more transactions retrieved based on the retailer ID;
for each of the retrieved one or more transactions, determine if the respective transaction time matches the potentially banned time pattern with the received transaction's transaction time, the potentially banned time pattern specifying relative transaction times of when a potentially banned transaction may occur; and
determine for each of the retrieved transactions matching the potentially banned time pattern if the respective wager information matches the wager information of the received transaction.

12. The system of claim 11, wherein the potentially banned time pattern specifies that potentially banned transactions occur within a threshold time of the received transaction.

13. The system of claim 12, wherein the threshold time is one of:
60 minutes;
45 minutes;
30 minutes; and
15 minutes.

14. The system of claim 11, wherein the potentially banned time pattern specifies that the potentially banned transaction occurs within one of a plurality of threshold times of the received transaction.

15. The system of claim 11, wherein the potentially banned time pattern is retrieved from a plurality of potentially banned time patterns each associated with retailed ID.

16. The system of claim 15, further comprising instructions, which when executed by the processing unit, configure the system to adjust the potentially banned time pattern associated with the retailer ID of the received transaction when the wager total exceeds the wager threshold.

17. The system of claim 10, wherein the one or more actions to take are based on a number of banned transactions that have occurred within a period time for the retailer associated with the retail ID.

18. The system of claim 17, wherein the one or more actions to take are escalated.

* * * * *